(12) United States Patent
Cosentino et al.

(10) Patent No.: US 6,431,648 B1
(45) Date of Patent: Aug. 13, 2002

(54) ADJUSTMENT MECHANISM WITH SLIDABLE SHAFT

(75) Inventors: Christopher Cosentino, Bolton; Tony Maier, Aurora; Jack Rietveld, Burlington; Igor Demin, Windsor, all of (CA)

(73) Assignee: Schukra of North America, Ltd., Etobicoke (CA)

(*) Notice: Subject to any disclaimer, the term of this patent is extended or adjusted under 35 U.S.C. 154(b) by 0 days.

(21) Appl. No.: 09/540,554

(22) Filed: Mar. 31, 2000

(51) Int. Cl.[7] .............................................. A47C 3/025
(52) U.S. Cl. .................................. 297/284.4; 297/284.1
(58) Field of Search ............................ 297/284.4, 284.1

(56) References Cited

U.S. PATENT DOCUMENTS

| | | |
|---|---|---|
| 1,743,377 A | 1/1930 | Nadell |
| 3,378,299 A | 4/1968 | Sandor ........................ 297/284 |
| 3,762,769 A | 10/1973 | Poschl ......................... 297/284 |
| 4,153,293 A | 5/1979 | Shaldon ....................... 297/284 |
| 4,313,637 A | 2/1982 | Barley ......................... 297/284 |
| 4,316,631 A | 2/1982 | Lenz ........................... 297/284 |
| 4,354,709 A | 10/1982 | Schuster ...................... 297/284 |
| 4,359,245 A | 11/1982 | Franke ........................ 297/284 |
| 4,601,514 A | 7/1986 | Meiller ........................ 297/284 |
| 4,627,661 A | 12/1986 | Ronnhult ..................... 297/284 |
| 4,632,454 A | 12/1986 | Naert .......................... 297/284 |
| 4,650,247 A | 3/1987 | Berg ........................... 297/284 |
| 4,676,550 A | 6/1987 | Neve De Mevergnies .. 297/284 |
| 4,880,271 A | 11/1989 | Graves ........................ 257/284 |
| 4,909,568 A | 3/1990 | Dal Monte ................... 297/284 |
| 4,968,093 A | 11/1990 | Dal Monte ................... 297/284 |
| 5,026,116 A | 6/1991 | Dal monte ................... 297/284 |
| 5,050,930 A | 9/1991 | Schuster ...................... 257/284 |
| 5,197,780 A | 3/1993 | Coughlin ................... 297/284.7 |
| 5,217,278 A | 6/1993 | Harrison ..................... 297/284 |
| 5,299,851 A * | 4/1994 | Lin |
| 5,335,965 A | 8/1994 | Sessini ........................ 297/284 |
| 5,385,531 A | 1/1995 | Jover .......................... 601/99 |
| 5,397,164 A | 3/1995 | Schuster ...................... 297/284 |
| 5,518,294 A | 5/1996 | Ligon, Sr. ................... 297/284 |
| 5,553,917 A | 9/1996 | Adat ....................... 297/230.14 |
| 5,567,010 A * | 10/1996 | Sparks |
| 5,626,390 A | 5/1997 | Schuster ...................... 297/284 |
| 5,762,397 A | 6/1998 | Venuto ........................ 297/284 |
| 5,775,773 A | 7/1998 | Schuster .................... 297/284.1 |
| 5,934,752 A * | 8/1999 | Klinger |

FOREIGN PATENT DOCUMENTS

| | | | |
|---|---|---|---|
| CA | 2181776 | 1/1998 | |
| DE | 2040794 | 8/1970 | .............. 297/284.4 |
| DE | 2345254 | 4/1974 | |
| DE | 2804-703 | 8/1979 | .............. 297/284.4 |
| EP | 0 322 535 A1 | 10/1988 | |
| GB | 2013487 | 8/1979 | ............ A47C/7/46 |
| SU | 0587924 | 1/1978 | .............. 297/284.4 |

* cited by examiner

*Primary Examiner*—Milton Nelson, Jr.
(74) *Attorney, Agent, or Firm*—Bereskin & Parr

(57) ABSTRACT

An adjusting mechanism is provided for a basket used in a portion of a seat to adjust the shape of the seat. The mechanism includes a handle that is rotatably engaged to a shaft. The shaft is slidably engaged within a bore in a gear that is part of a gear mechanism. The gear mechanism is connected to a first end of the basket and a link is connected from the gear mechanism to a second end of the basket. The bore has a complementary cross sectional profile to the shaft to permit rotation thereby. The shaft is slidable along the axis of the bore to permit changes in the relative position between the handle and the gear mechanism.

12 Claims, 6 Drawing Sheets

ADJUSTMENT MECHANISM WITH SLIDABLE SHAFT

FIELD OF THE INVENTION

The present invention is directed to adjustment mechanisms for shape adjusting baskets of seats.

BACKGROUND OF THE INVENTION

Seats for vehicles or for use at the home or office may be provided with internal structures that are adjustable to change the shape of the seat to comfortably support the occupant. The mechanisms for adjusting the seats typically include a basket that is flexed by a link such as a cable. A handle is operably connected with a shaft to a gear mechanism for adjusting the amount of flex provided by the link. The handle protrudes to one side of the seat where it may be grasped and manipulated as desired to adjust the seat.

It is desirable that the structure of the adjustment mechanism be sufficiently versatile to accommodate seats of different widths. Presently, the shaft length is dictated by the distance between the handle located at the sidewall of the seat and the gear mechanism located internally within the seat. Significant savings in production costs can be achieved by reducing the number of shaft lengths required to accommodate seats of different widths. For aesthetic reasons, it is also desirable that the handle be retractable to a position that is generally flush with the sidewall of the seat to provide a sleeker overall profile.

BRIEF SUMMARY OF THE INVENTION

In one aspect, the present invention provides an adjustment mechanism for a basket, the mechanism comprising;
a handle;
an elongate shaft operably connected to said handle for rotation thereby; and
a gear mechanism connected to a link for flexing said basket, said gear mechanism being attachable to a first end of the basket and said link being attachable to a second end of the basket, said gear mechanism including a gear defining a bore for slidably receiving said shaft, said bore having a complementary cross sectional profile to said shaft over at least a portion of its length to translate rotational movement of said shaft into rotational movement of said gear; wherein said shaft is permitted to slide along the axis of said bore while remaining in rotatable engagement therewith to permit changes in the relative positions of said handle and said gear mechanism.

In another aspect, the invention provides an apparatus comprising:
aportion of a seat having a sidewall defining a recess;
a basket located within said seat portion;
a handle disposed in said recess;
an elongate shaft operably connected to said handle for rotation thereby; and
a gear mechanism connected to a link for flexing said basket, said gear mechanism being attached to a first end of the basket and said link being attached to a second end of the basket, said gear mechanism including a gear defining a bore for slidably receiving said shaft, said bore and said shaft having complementary cross sectional profiles over at least a portion of their lengths to translate rotational movement of said shaft into rotational movement of said gear; wherein said shaft is permitted to slide along the axis of said bore while remaining in rotatable engagement therewith to permit changes in the relative positions of said handle and said gear mechanism.

BRIEF DESCRIPTION OF THE DRAWINGS

The invention will be better understood with reference to the drawings in which.

DETAILED DESCRIPTION OF PREFERRED EMBODIMENTS

Figure 1:
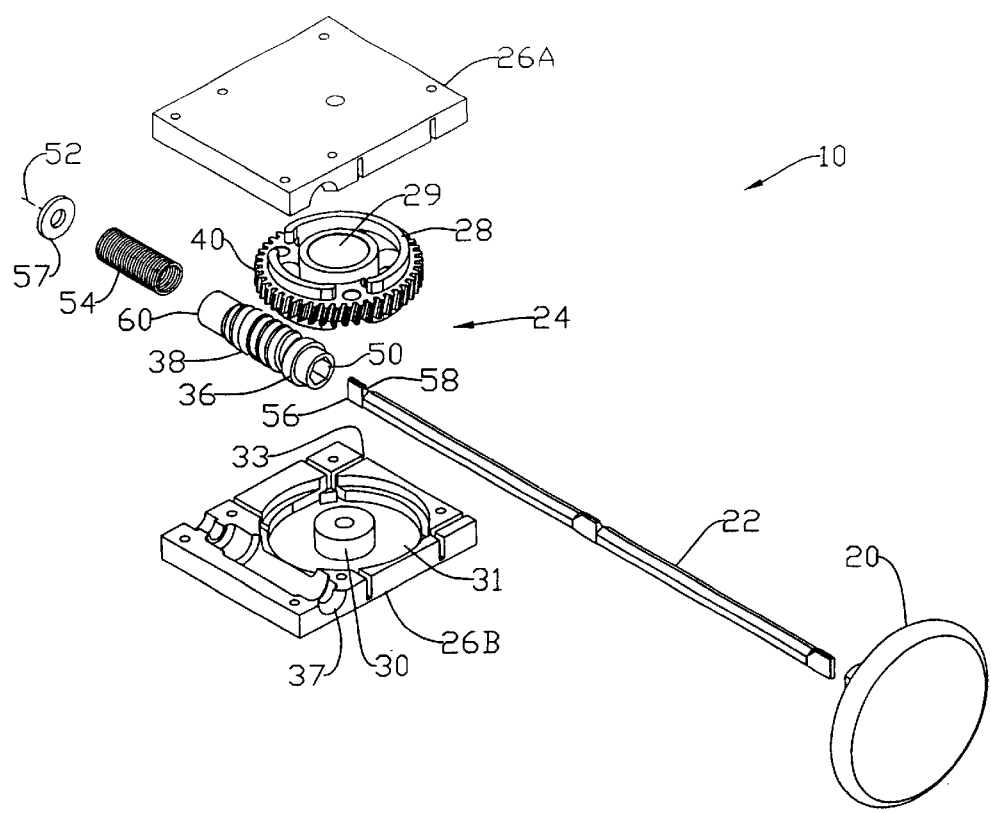
FIG. 1 is an exploded perspective view of an adjustment mechanism in accordance with the present invention.
Figure 2:
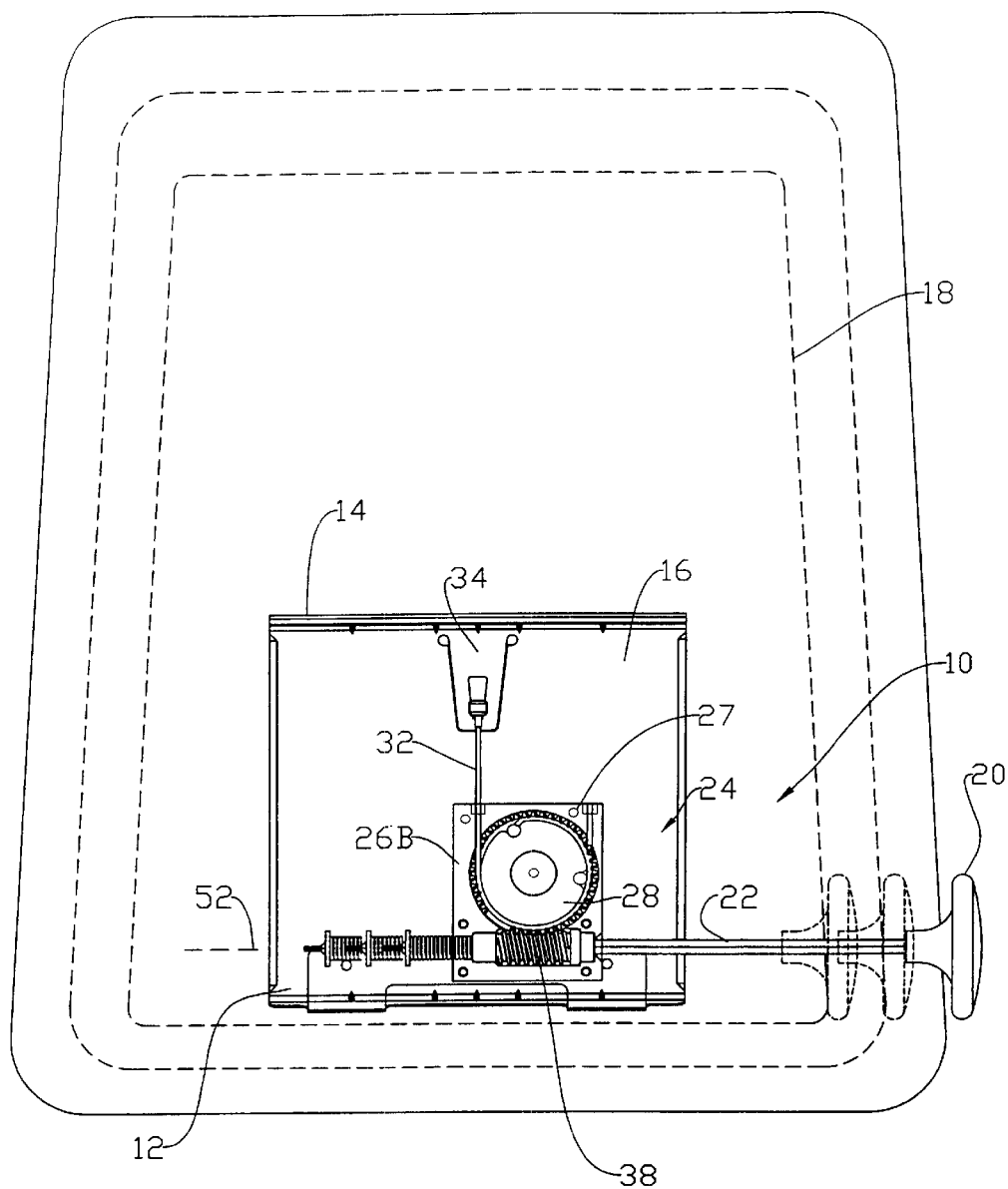
FIG. 2 is a partial rear view of a back rest portion of a seat incorporating a shape adjusting basket and the adjustment mechanism of FIG. 1.

Referring to FIGS. 1 to 5, an adjustment mechanism in accordance with the present invention is shown generally at 10.

The adjustment mechanism is provided to flex first and second ends 12 and 14 of a resilient shape adjusting basket 16 toward one another to define a controlled arch. The basket 16 is provided in the backrest portion 18 of a seat. Such baskets 16 are commonly used to provide support in the lumbar region of a person's back. The adjustment mechanism 10 might alternatively be used to flex baskets 16 located in a bottom portion or a headrest portion of a seat.

The adjustment mechanism 10 includes a handle 20 that is connected with a fastener 21 such as a screw, rivet, pin, glue or a friction fit to an elongate shaft 22. The shaft 22 in turn engages a gear mechanism 24. The gear mechanism 24 includes a lock plate 26, formed by half plates 26A and 26B, that is mounted with fasteners 27 such as screws, rivets or welds to the first end 12 of the basket 16. The gear mechanism 24 comprises a worm gear or helical gear 28 that is driven by a worm 36. The worm gear 28 has a bore 29 that receives and rotates about a hub 30 defined in a cavity 31 in the locking plate 26. A link 32 such as a flexible cable or a rigid bar is secured at one end to the worm gear 28 and at its other end to a tab 34 extending from the second end 14 of the basket 16. The link 32 extends from the lock plate 26 through a slot 33 defined in the lock plate 26. The worm 36 is operably connected to the worm gear 28 such that the thread 38 of the worm 36 operably engages the teeth 40 of the worm gear 28. The worm 36 is supported in a channel 37 defined in the lock plate 26.

Figure 5:
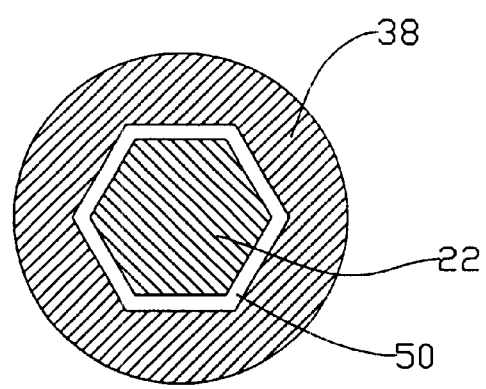
FIG. 5 is a sectional view of the shaft and gear mechanism of FIG. 4 as viewed along lines 5—5.

A bore 50 is defined along a longitudinal axis 2 through the worm 36 for slidably receiving the shaft 22. The cross sectional profiles of the bore 50 and the shaft 22 are sized to permit movement of the shaft 22 along the axis 52 of bore 50 and, at least for a portion of the respective lengths of the bore 50 and shaft 22, are shaped to permit rotational movement of the shaft 22 to be translated into rotational movement of the worm 36. As shown in FIG. 5, a hexagonal profile for each of the bore 50 and shaft 22 has been found to be suitable. Other profiles that function to transmit force rotationally may also be used such as a square profile or a splined profile.

Figure 3A:
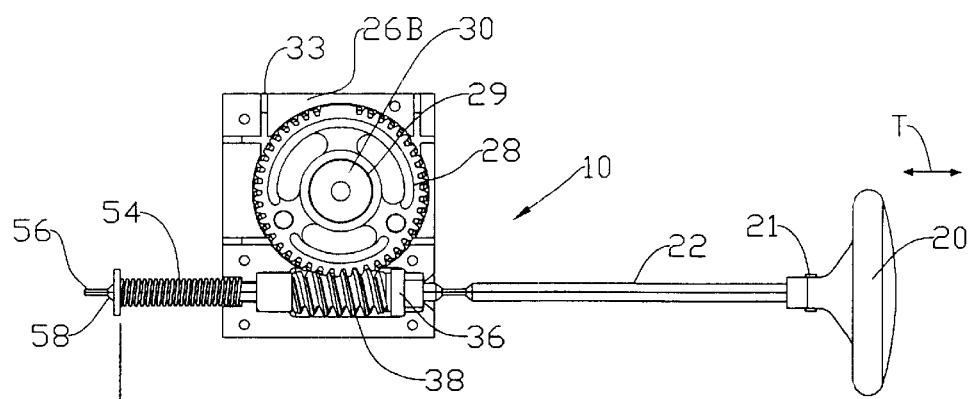
FIGS. 3A and 3B are side views of the adjustment mechanism of FIG. 1 showing a handle in a retracted position and an operating position respectively.
Figure 3B:
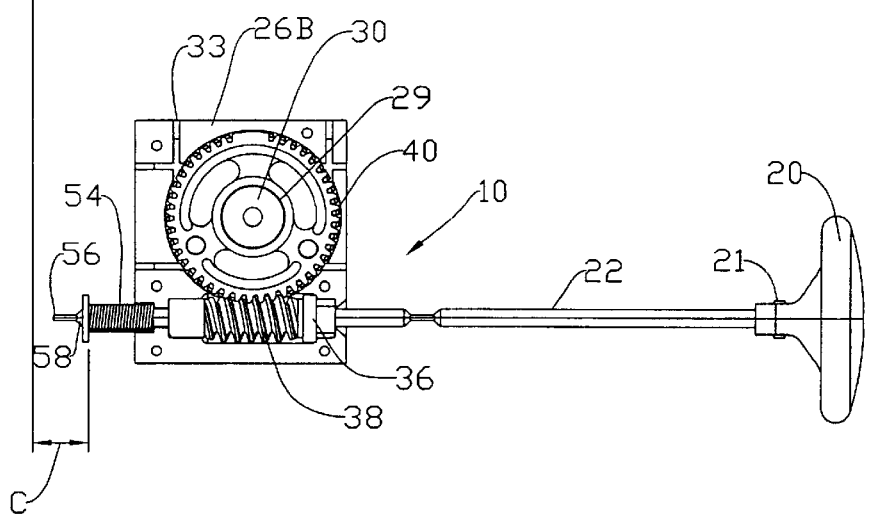
Figure 4:
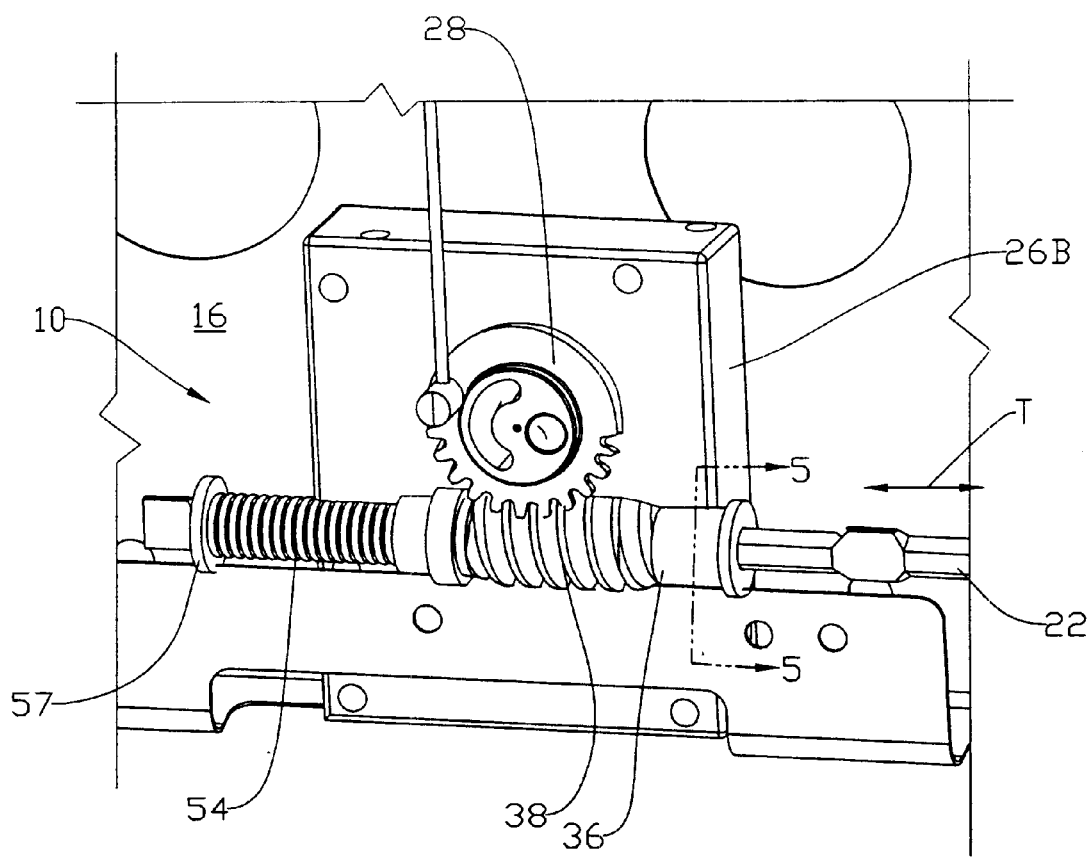
FIG. 4 is a detailed rear view of a shaft and gear mechanism for the adjustment mechanism of FIG. 1.

A spring 54 is mounted to the shaft 22 to bias the shaft 22 and handle 20 inwardly toward the basket 16. Preferably, the spring 54 surrounds the shaft 22 adjacent to its free end 56 where the shaft 22 protrudes from the bore 50. One end of the spring 54 engages a washer 57 that abuts against an abutment 58 defined on the shaft 22 and the other end of the spring 54 engages an end 60 of the worm 36. The length of compression C of the spring 54 is selected to equal or exceed the desired length of travel T of the shaft 22 between an operating position (as shown in FIG. 3B) and a retracted position (as shown in FIG. 3A). The length of travel T is also dictated by the anticipated widths of seat that are intended to utilize the same length of shaft 22.

Figure 6:
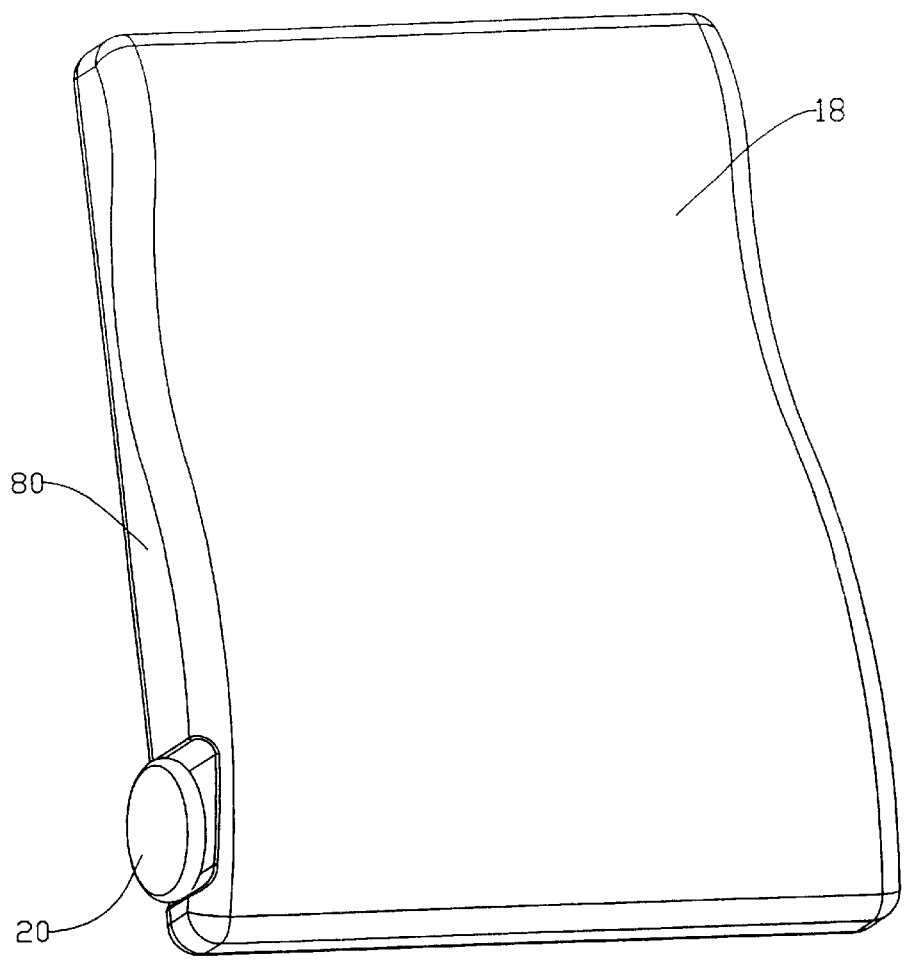
FIG. 6 is a front perspective view of a back rest portion with the adjustment mechanism of FIG. 1, the handle of the adjustment mechanism being shown in a retracted position.
Figure 7:
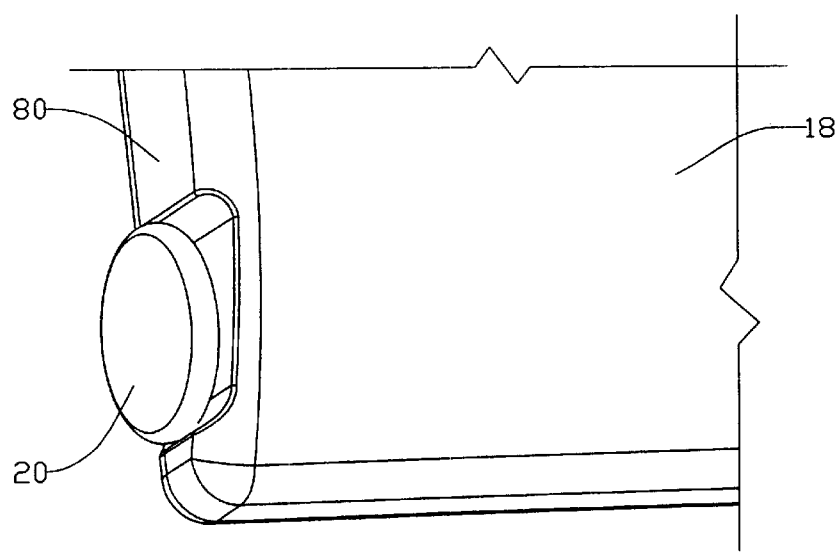
FIG. 7 is an enlarged front perspective view of the back rest portion and adjustment mechanism of FIG. 6.
Figure 8:
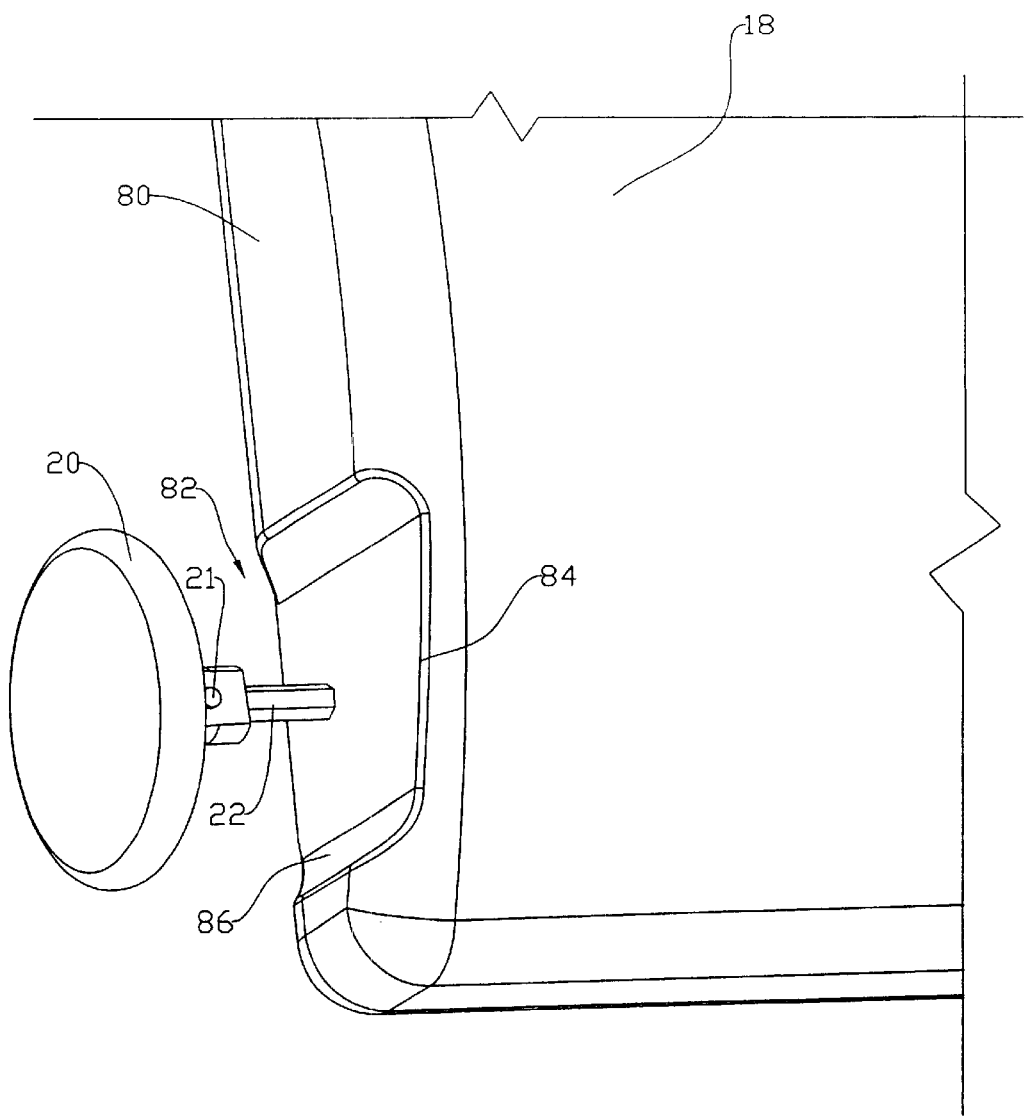
FIG. 8 is an enlarged front perspective view of the back rest portion and adjustment mechanism of FIG. 6, the handle of the adjustment mechanism being shown in an operating position.

Referring to FIGS. 6 to 8, it may be seen how the handle 20 may be retracted into a nearly flush position with a sidewall 80 of the backrest portion 18 of the seat. As shown in FIG. 8, a recess 82 is defined in the sidewall 80 for receiving the handle 20. The walls 84 of the recess 82 may be defined by a moulded plastic insert 86 for greater rigidity. Sufficient room is provided in the recess 82 beyond the periphery of the handle 20 to permit a user to grasp the edge of the handle 20 to pull the handle 20 away from the sidewall 80 of the seat.

In use, an individual wishing to adjust the shape of the backrest portion 18 of the seat would grasp the handle 20 and pull it from its retracted position to its operating position away from the sidewall 80 of the seat. The shaft 22 of the adjustment mechanism 10 would slide within the bore 50 of the worm 36 along axis 52 and remain in rotatable engagement therewith. Rotation of the shaft 22 would in turn cause rotation of the worm 36. Rotation of the worm 36 would cause rotation of the worm gear 28. Rotation of the worm gear 28 would move the link 32 and thus increase or decrease the amount of flex in the basket 16. Once the flex has been adjusted a desired amount the individual may release his grasp of the handle 20 and it will be caused to retract to its recessed position under the bias of the spring 54.

It is to be understood that what has been described is a preferred embodiment of the invention. The invention is nonetheless susceptible to certain changes and alternative embodiments fully comprehended by the spirit of the invention as described above, and the scope of the claims set out below.

We claim:

1. An adjustment mechanism for a basket, the mechanism comprising;
   a handle;
   an elongate shaft operably connected to said handle for rotation thereby; and
   a gear mechanism connected to a link for flexing said basket, said gear mechanism being attachable to a first end of the basket and said link being attachable to a second end of the basket, said gear mechanism including a gear defining a bore for slidably receiving said shaft, said bore having a complementary cross sectional profile to said shaft over at least a portion of its length to translate rotational movement of said shaft into rotational movement of said gear; wherein said shaft is permitted to slide along the axis of said bore while remaining in rotatable engagement therewith to permit changes in the relative positions of said handle and said gear mechanism.

2. A mechanism as claimed in claim 1, wherein said gear comprises a worm.

3. A mechanism as claimed in claim 2, wherein said worm is operably engaged to a worm gear.

4. A mechanism as claimed in claim 3, wherein said link is connected to said worm gear.

5. A mechanism as claimed in claim 1, wherein said shaft is spring biased to travel toward said gear mechanism relative to said handle.

6. A mechanism as claimed in claim 1, wherein said bore extends fully through said worm.

7. An apparatus comprising:
   a portion of a seat having a sidewall defining a recess;
   a basket located within said portion of said seat;
   a handle disposed in said recess;
   an elongate shaft operably connected to said handle for rotation thereby; and
   a gear mechanism connected to a link for flexing said basket, said gear mechanism being attached to a first end of said basket and said link being attached to a second end of the basket, said gear mechanism including a gear defining a bore for slidably receiving said shaft, and bore and said shaft having complementary cross sectional profiles over at least a portion of their lengths to translate rotational movement of said shaft into rotational movement of said gear;
   wherein said shaft is permitted to slide along the axis of said bore while remaining in rotatable engagement therewith to permit changes in the relative positions of said handle and said gear mechanism.

8. An apparatus as claimed in claim 7, wherein said gear comprises a worm.

9. An apparatus as claimed in claim 8, wherein said worm is operably engaged to a worm gear.

10. An apparatus as claimed in claim 9, wherein said link is connected to said worm gear.

11. An apparatus as claimed in claim 7, wherein said shaft is spring biased to travel toward said gear mechanism relative to said handle.

12. An apparatus as claimed in claim 7, wherein said bore extends fully through said worm.

* * * * *